United States Patent [19]
Kirkpatrick et al.

[11] Patent Number: 5,931,772
[45] Date of Patent: *Aug. 3, 1999

[54] USE OF SPENT BAUXITE AS AN ABSORBENT OR SOLIDIFICATION AGENT

[75] Inventors: David B. Kirkpatrick; A. Dyer Lafleur, both of Baton Rouge, La.

[73] Assignee: Kaiser Aluminum & Chemical Corp., Pleasanton, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/740,474

[22] Filed: Oct. 30, 1996

Related U.S. Application Data

[60] Provisional application No. 60/007,130, Oct. 31, 1995.

[51] Int. Cl.$^6$ ................................. A62D 3/00; B09B 3/00
[52] U.S. Cl. ..................... 588/256; 405/129; 588/252; 588/901
[58] Field of Search ................................. 502/406, 415, 502/332, 336, 338, 350, 351; 423/121, 122; 106/705, 713, 792; 405/128, 129; 588/249, 252, 256, 257, 901

[56] References Cited

U.S. PATENT DOCUMENTS

| | | | |
|---|---|---|---|
| 174,387 | 3/1876 | Smith | 106/792 |
| 1,778,517 | 10/1930 | Benner et al. | 502/336 |
| 2,246,900 | 6/1941 | Schulze et al. | 502/415 |
| 2,432,071 | 12/1947 | Thibon | 502/415 |
| 2,434,389 | 1/1948 | Breth et al. | 502/415 |
| 3,295,924 | 1/1967 | Colombo | 423/121 |
| 3,311,449 | 3/1967 | Atsukawa et al. | 423/122 |
| 3,417,031 | 12/1968 | Hinrichs et al. | 502/338 |
| 3,892,897 | 7/1975 | Rittler | 502/351 |
| 3,944,648 | 3/1976 | Solymar et al. | 423/121 |
| 4,017,425 | 4/1977 | Shiao | 423/121 |
| 4,028,130 | 6/1977 | Webster et al. | 106/120 |
| 4,096,096 | 6/1978 | Nishikawa et al. | 502/338 |
| 4,265,864 | 5/1981 | Sugahara et al. | 423/121 |
| 4,270,875 | 6/1981 | Kaiwuma et al. | 405/129 |
| 4,432,666 | 2/1984 | Frey et al. | 588/257 |
| 4,488,971 | 12/1984 | Bolsing | 405/128 |
| 4,541,752 | 9/1985 | Phillips | 405/129 |
| 4,577,999 | 3/1986 | Lindorfer et al. | 405/128 X |
| 4,917,733 | 4/1990 | Hansen | 106/85 |
| 5,217,620 | 6/1993 | Mahoney et al. | 423/121 |
| 5,266,111 | 11/1993 | Barbour | 106/713 |
| 5,322,389 | 6/1994 | Smith | 588/252 X |
| 5,328,507 | 7/1994 | Crocker | 106/705 |
| 5,342,442 | 8/1994 | Nechvatal et al. | 106/705 |
| 5,456,553 | 10/1995 | Li et al. | 405/263 |
| 5,538,552 | 7/1996 | Osing et al. | 588/256 X |
| 5,704,972 | 1/1998 | Ivkovich | 106/792 |
| 5,830,815 | 11/1998 | Wagh et al. | 588/252 X |

*Primary Examiner*—George Suchfield
*Attorney, Agent, or Firm*—Joseph T. Regard, Ltd.

[57] ABSTRACT

A composition particularly useful in solidifying liquid wastes for disposal in landfills, including, for example, liquid industrial wastes. The preferred embodiment of the present invention contemplates a composition primarily composed of bauxite tailings that remain after alumina extraction, also known as "red mud". The tailings are dewatered, dried to a low moisture content, sized to an optimal particulate size, and then applied to the liquid waste. The addition of a small amount of pozzolanic material can improve the handling and solidification characteristics of the composition under certain situations, and is provided in an alternative composition. The present absorption composition is an improvement over existing solidification agents, in that it can absorb liquid hydrocarbon wastes without the water normally required with prior art pozzolanic agents such as fly ash or Portland cement, works equally well with water-based wastes, is less dusty, and readily absorbs and contains transient odors associated with wastes absorbed therein.

6 Claims, 5 Drawing Sheets

Table II.
Typical Solification Results based on Paint Filter Test

| Absorbant | Water Results<br>Amount, gms/ml water | Observation |
|---|---|---|
| Dried Red Mud | 2.12 | Handlible |
| 75% Fly Ash/25% Lime | 2.02 | 30 Minutes to Solid |
| C Fly Ash | 2.17 | 16 Minutes to Solid |
| Portland Cement | 2.87 | 60 Minutes to Solid |
|  |  |  |
|  | Oil Results |  |
| Absorbant | Amount, gms/ml liquid | Observation |
| Dried Red Mud | 2.04 | Dry to Touch |
| Minimum 75% Fly Ash/ 25% lime to pass paint Filter Test | 2.63 | Does not hold shape |
| Minimum 75% Fly Ash/ 25% Lime to hold shape | 4.75 |  |
| Portland Cement | 2.59 | Does not hold shape |

FIGURE 1

| TABLE I. Typical Red Mud Absorbant Properties ||
|---|---|
| X-Ray Analysis, wt.% | Range |
| $Fe_2O_3$ | 46-53 |
| $Al_2O_3$ | 12-16 |
| $TiO_2$ | 6-10 |
| CaO | 4-13 |
| $SiO_2$ | 1-5 |
| $Na_2O$ | 0.5-3.5 |
| MnO | 1-2 |
| $P_2O_5$ | 1-2 |
| MgO | 0.3-1.0 |
| $V_2O_5$ | 0.1-1.0 |
| $CO_2$ | 2-4 |
| $SO_3$ | 0-0.4 |
| LOI | 9-15 |
| PROPERTIES | |
| Flash, COC, °F | >200 |
| Color | Reddish Brown |
| pH | 10-12 |
| BET (Surface Area), $M^2/gm$ | 45-55 |
| Bulk Density, pcf | 70-85 |
| Specific Gravity | 2.9-3.3 |
| Moisture, wt.% | 0-5 |
| Water Absorbance, gms/ml | 1.6-2.6 |
| Oil Absorbance, gms/ml | 1.3-2.3 |

| EPA TCLP Tier II Results | | |
|---|---|---|
| ppm metals in Leachate | | EPA Limit |
| Arsenic | 0.0-0.06 | 5.0 |
| Barium | 0.0-0.6 | 100 |
| Cadmium | 0.0-0.50 | 1.0 |
| Chromium | 0.0-0.04 | 5.0 |
| Lead | 0.0-0.40 | 5.0 |
| Mercury | 0.0-0.001 | 0.2 |
| Silver | 0.0-0.006 | 5.0 |
| Selenium | 0.0-0.005 | 1.0 |

FIGURE 3

USE OF SPENT BAUXITE AS AN ABSORBENT OR SOLIDIFICATION AGENT

This application claims benefit of provisional application 60/007,130, filed Oct. 31, 1995.

TECHNICAL FIELD OF THE INVENTION

The present invention relates to absorbents, and in particular to a composition particularly useful in solidifying liquid wastes for disposal in landfills, including, for example, liquid industrial wastes. The preferred embodiment of the present invention contemplates a composition primarily composed of bauxite tailings that remain after alumina extraction, also known as "red mud". The tailings are dewatered, dried to a low moisture content, sized to an optimal particulate size, and then applied to the liquid waste. Addition of a small amount of pozzolonic material can improve the handling and solidification characteristics of the composition in certain circumstances, and is provided in an alternative composition. The present composition is an improvement over existing solidification agents, in that it can absorb liquid hydrocarbon wastes without the water normally required with prior art pozzolanic agents, such as fly ash or Portland cement, works equally well with water-based wastes, is less dusty, and absorbs transient odors associated with wastes absorbed therein.

BACKGROUND OF THE INVENTION

While Red Mud has been utilized in limited capacities as landfill material and the like, the prior art is not believed to contemplate or suggest the utilization of primarily red mud of an ideal particulate size for the absorption of industrial wastes, including liquid hydrocarbons, as well as non-hydrocarbon aqueous media, as contemplated in the present invention.

Pat. No. 4,270,875, entitled "Method of Creating Landfill from Red Mud", issued to Nippon Light Metal Co., Ltd. contemplates the utilization of compressed red mud "cakes" as a landfill medium for reclaiming land. Unlike the present invention, '875 contemplates the utilization of the red mud not in an absorbing capacity, but rather as a filler.

Pat. No. 5,456,553 issued 1995 teaches a "Soil or Ground Reinforcement Treatment Method" wherein there is disclosed a ground reinforcing composition, which may include red mud therein, for the purpose of reinforcing crushed stones, natural soil, or the like to enhance the strength and viscoelasticity thereof Pat. No. 4,028,130 issued 1977 contemplates a "Disposal Method and use of Sewage Sludge" in which digested sewage sludge is transformed into a hardened composition that can then be used to form, as an example, a road base, using a mixture of 1–15% lime or the equivalent, 1–50% digested sewage sludge solids, and 20–90% fly ash, "or an equivalent amount of a fly ash substitute selected from the group consisting of siliceous incineration residue, "alum" water treatment plant waste, or "red mud" by-product of a bauxite reduction process, and water sufficient to provide a moisture content (based on weight % of dry solids) of 5–50%, the combination of said materials being cementitiously harden able under atmospHeric conditions", as set forth in claim Twenty.

First, the '130 reference defines "red mud" in only the broadest capacity, without an indication as to the components or makeup of the referenced material. The makeup and characteristics of red mud can vary considerably, depending upon the source and alumina extraction process used.

'130 clearly contemplates a composition that is "cementitiously hardenable" upon combining, unlike the present, applied for invention, which does not harden like a rock, (although technical properties would classify it as a silt with relatively low plasticity). Nonetheless, the absorbed mass provides better handling and more diverse use in a landfill or other capacity than pozzolonically hardened material, as taught in '130. Further, '130 does not disclose with specificity particulate sizes, and indicates a moisture content range believed to be in excess of what would be useful for the present invention.

Also, unlike '130, the present invention does not require water, a critical component in '130, to function in a useful capacity. Lastly, '130 contemplates a composition including sewage sludge, and does not consider other aqueous solutions, or as is the primary focus of the present invention, liquid hydrocarbon waste. Further, '130 is primarily directed to pozzolanic materials such as fly ash or the like, and only refers to "red mud" in a sort of alternative capacity, without revealing actual use or testing of a red mud composition. Indeed, based upon empirical evidence, the red mud composition of the present, applied for invention, would not pozzolonically react with water in the manner contemplated in '130. It is therefore suggested that, at least with the red mud of the present invention, the '130 red mud alternative could be argued as inoperative, or not provide the degree or type of containment as is contemplated in '130.

Besides the above patents, red mud has been used with the manufacture of building bricks, flame retardant materials, ceramics, and hydrocarbon catalysts.

GENERAL SUMMARY DISCUSSION OF THE INVENTION

The Kaiser Aluminum & Chemical Company, Inc. plant in Gramercy, La. U.S.A. uses the Bayer process to produce alumina from Jamaican North Coast bauxite The process removes the alumina by means of a high temperature, high pressure caustic digestion. During the process, the spent bauxite, or red mud, is separated from the alumina, pH balanced, and discharged into on-site impoundment lakes as a low-solids slurry.

Currently, more than 1,000,000 tons per year of red mud is produced as a by-product of the alumina refining process. This by-product has been stockpiled on-site since 1974, resulting in the accumulation of more than 20,000,000 tons of red mud being stockpiled at the Gramercy site. Extensive laboratory work and pilot tests have been done to develop useful products from the low-solids lake material. One such product is a liquid waste absorbent.

During the development project, it was learned that landfills must solidify liquid wastes before proper disposal can be accomplished. Current solidifying agents, such as fly ash, lime, and Portland cement, solidify by means of a pozzolanic reaction with water, in which the absorbed composition is chemically hardened. These materials have drawbacks due to border line hazardous pH (about 12.5) in the final product, and excessive dustiness during application. Also, excessive amounts of these pozzolanic solidifiers are needed to solidify non-water-based wastes. Since laboratory testing has established that the dried red mud particle has a high surface area, and the large particle size decreases dustiness, by that supporting the use of dried red mud as a waste absorbent.

The preferred embodiment of the invention contemplates the use of the prepared red mud composition as an absorbing agent for water based, and non-water based liquid waste materials. The material is used to absorb liquids and thereby contain liquid waste for proper disposal in a landfill. The dried red mud is safe, having a pH of about 10–12, and thus does not add to any pH hazards associated with prior art solidifying waste material. Also, the material is less dusty than currently used materials, decreasing air emissions from landfills, and the dust, having a lesser pH than lime, fly ash, or Portland cement, is safer.

The red mud is discharged from the Bayer process, which is used to extract alumina, as a low solids slurry. This slurry may or may not be neutralized for this product, but ideally should have an end pH of 12 or less. The slurry is dewatered by conventional gravitational or conventional mechanical means to between 45 and 60% solids. The material may then be impounded at the storage terminal, referred to as a "lake" due to the accumulation of water on the surface due primarily to natural rainfall.

Further dewatering of the tailings at the lake is similar to the draining of a swamp. The surface water must be removed, allowing the crust to harden. In order to facilitate further natural evaporation and solar drying, the dried crust must be broken up via discing or the like, increasing the surface material to 65–70% solids. Other land management techniques may be implemented to facilitate the same reduction of moisture, depending upon the environmental conditions, economic considerations, etc.

The material is then harvested and optimally dried to >91% (optimally >95%) solids using any one of many mechanical drying methods including, for example, a rotary drum dryer. Other methods include, but are not limited to, kilns, hearths and ovens. The product is then sized to an optimal particulate size.

Lastly, the final product is then added to the liquid waste and mixed (if necessary), using conventional application methods, as is used with lime, fly ash, or Portland cement, allowed to absorb the fluid.

It has also been found that addition of up to 5% (or even as high as, for example, 10%) of a pozzolonic solidifying agent, such as, Portland cement, lime, or fly ash, may under certain conditions improve the handlibility of the absorbed waste/red mud material. The final material is still less dusty and of lower pH than the currently used solidifiers.

It is therefore an object of the present invention to provide an industrial liquid waste absorbent that uses dried bauxite tailings.

It is another object of the present invention to provide an industrial liquid waste absorbent that does not require the use of water for absorbing and retaining liquid hydrocarbon or other non-water waste.

It is another object of the present invention to provide an industrial liquid waste absorbent that has a lower pH than conventional pozzolanic agents, while decreasing dust released into the air.

It is another object of the present invention to provide an industrial liquid waste absorbent that absorbs odors as well as liquids, unlike prior art solidification agents such as fly ash or the like.

It is still another object of the present invention to provide a means of disposing of spent bauxite tailings in an environmentally effective manner.

Lastly, it is an object of the present invention to provide an absorption composition that is economical, easy to implement, safe, and effective.

BRIEF DESCRIPTION OF DRAWINGS

For a further understanding of the nature and objects of the present invention, reference should be had to the following detailed description, taken with the accompanying drawings, in which like parts are given like reference numerals, and wherein:

FIG. 1 is a table setting forth solidification results for the composition of the present invention, compared with other prior art absorption compositions.

FIG. 3 is a table setting forth various properties of the preferred embodiment of the absorbent composition of the present invention.

DETAILED DISCUSSION OF THE INVENTION

Red mud properties and composition for the preferred embodiment of the present invention are shown in FIG. 3, attached, comprising the spent bauxite tailings from the Kaiser Aluminum & Chemical Company, Inc. alumina recovery plant in Gramercy, La.

Figure 4:
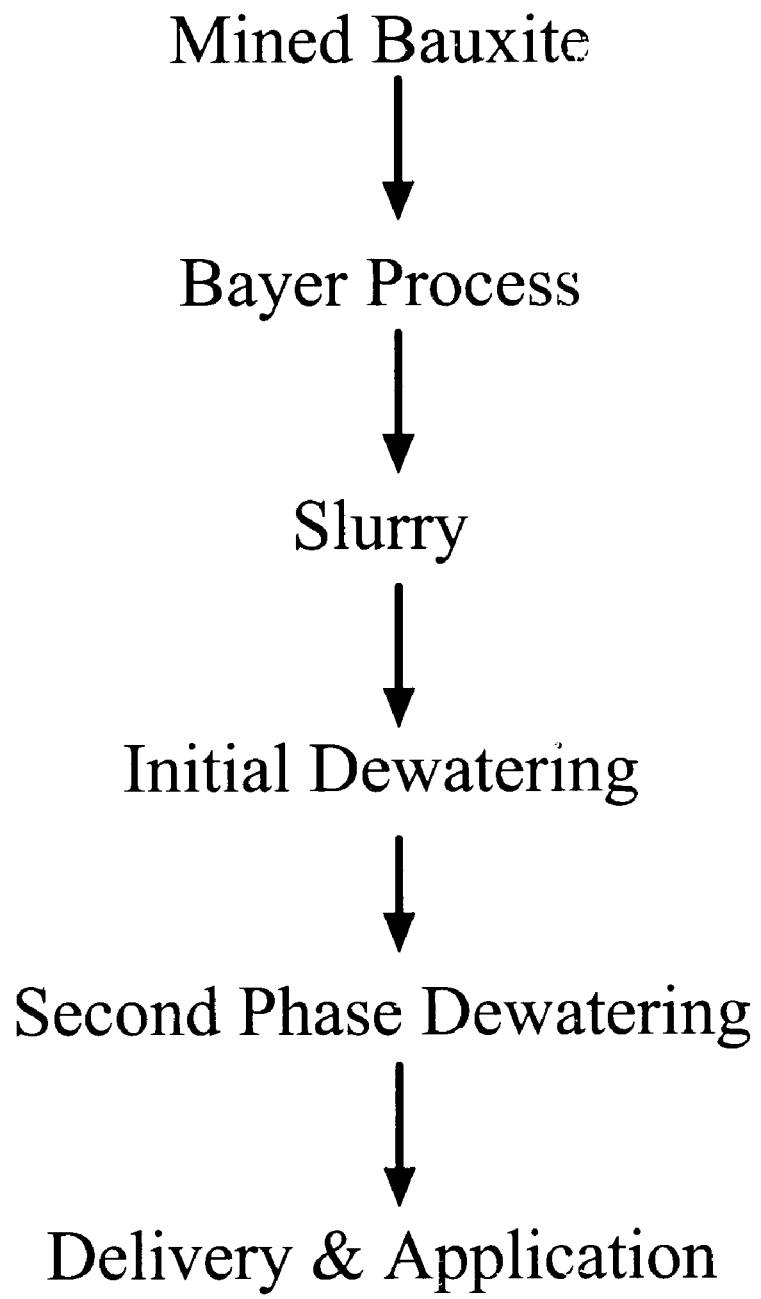
FIG. 4 is a flowchart illustrating the method of the preferred embodiment of the present invention.
Figure 5:
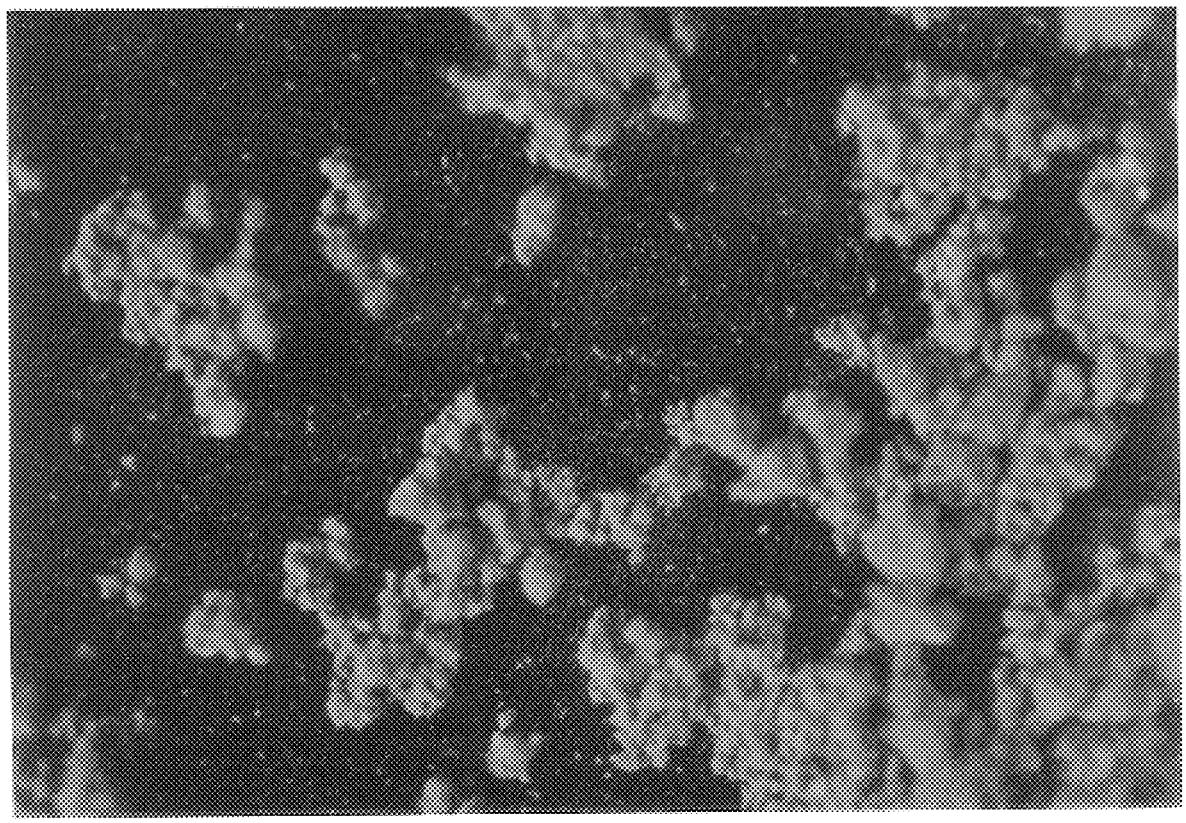
FIG. 5 is a micrograpH at 2.5× magnification, illustrating agglomorate particles of about 100 micron each, forming the composition of the present invention.

As discussed supra, and shown in FIG. 4, these tailings are dewatered via conventional dewatering and dried as earlier discussed to obtain about a 5% moisture, although the present composition works well within a broader range of, for example, 1–20% moisture range.

Once dried, the composition is sized to provide a $\frac{1}{8}$–$\frac{1}{16}$th screen particulate size, such that there is about a 40% passing of the material through a 50-mesh screen size with the preferred embodiment of the invention, although the percentage may vary somewhat and still provide a material that functions satisfactorily depending upon the application.

This results in a particulate size of generally less than $\frac{1}{8}$", the particulate having a shape generally corresponding to that of a agglomerate of generally silt configured particles and having widths generally corresponding in some function to their widths, thereby providing a high surface contact area, ideal for use in the present absorbent capacity.

Once dried to above criteria, the composition can be handled in the same fashion as other solidifiers when used by the landfill operator, and can be dispensed and spread using conventional methods and equipment for other materials such as fly ash, lime, etc.

Referring to FIG. 3, the red mud which has been utilized comprises about 46–53% iron oxide, although a broader range of 35–60% iron oxide would, it is believed, provide results somewhat compatible with the present system. Further, there is shown aluminum oxide having a percentage composition range of 12–16% (although 10–20% would likely be permissable with no great degradation), titanium of about 6–10%, (or even as low as 5%) and a number of trace materials.

Continuing with FIG. 3, the composition of the preferred embodiment of the present invention is found to have a pH of between about 10–12, which is less pH than lime or fly ash, and is thereby a safer and more environmentally acceptable absorbent, when compared to prior art materials, which had a borderline hazardous pH of 12.5.

The composition of the present invention has a BET (surface area) of about 44–55 $M^2$/gm, a specific gravity of 2.9–3.3, a bulk density of 70–85 lb/ft$^3$. The present system has been found to provide water absorbance of 1.6–2.6 gms/ml, and oil absorbance of 1.3–2.3 gms/ml in tests, an acceptable absorbance ratio when compared to present absorbents used in industrial applications.

Also indicated in FIG. 3 is the Environmental Protection Agency limits for various materials present in trace amounts in leachate from the red mud composition of the present invention, although, as indicated, the presence is in amounts far less than is tolerated under EPA guidelines.

Unlike the present composition, fly ash, Portland cement, and lime are pozzolans, and by that, solidify by reaction with water to harden the waste. The compound of the present invention is not pozzolanic with water, and thereby does not harden into unmanageable stone after absorbing the liquid waste material.

In working with water-based waste, the quantities of prior art agents needed to solidify a water-based waste are similar to the amount of dried red mud needed in its absorbent capacity. While the red mud composition of the present invention may take a little longer to absorb the water-based waste than fly ash, lime or the like, when taking into account the extra time required for the pozzolanic agents to solidify, the red mud works about in the same amount of time to absorb the waste, but without solidification.

When working with an oil-based waste, the amount of dried red mud is much less than a typical solidifier, as the red mud does not require water, and absorbs most liquids, including hydrocarbons. Typical results are shown in FIG. 1, attached.

As shown, the dried red mud composition of FIG. 3, having been sized and prepared, is added to water at a ratio of 2.12 grams of material per milliliter of water, as shown in FIG. 1. After several minutes, the water is fully absorbed such that it can pass the paint filter test, yet the material remained handible, so that it can be shaped or manipulated by standard earthmoving equipment with relative ease. Further, the red mud, having absorbed the waste material, will generally resist leaching of most contaminants from the absorbed mass, locking the waste within the mass of absorbent, but without the necessity of the pozzolanic reaction required in prior art materials including, as indicated, fly ash, lime, or Portland cement.

As further shown on FIG. 1, fly ash/lime may require slightly less (0.10 less) gms/ml water for adequate absorption of the water, it requires a full 30 minutes to set before the mass is fully absorbed and pozzolanically locked within the mass, to pass the paint filter test.

Fly ash and Portland cement actually required more material to lock away the same amount of water, further requiring up to an hour for the pozzolanic reaction to occur. As shown, the red mud used comprises about 46–53% iron oxide, although a broader range of 35–60% iron oxide would, it is believed, give results compatible the present system. Further, there is shown aluminum oxide having a percentage composition range of 12–16%, titanium of about 6–10%, and a number of trace materials.

With hydrocarbon or other non-water liquid absorption, the results are even more dramatic. As shown, even less of the composition of the present invention is required to absorb the exemplary liquid hydrocarbon (motor oil) than the same amount of water, while the other materials required significantly more material, up to 2.5 times more material than the red mud of the present invention, before the liquid waste could be solidified enough to pass the paint filter test. Further, because water was not a component of this test, no pozzolanic reaction occurred with the comparison materials, so the absorbed waste mass did not hold its shape, or turn to stone.

Although the composition of the present invention does not calcine like the other materials, it nonetheless retains its form, once dried, even when exposed to large amounts of water, the cohesion of the particles resisting the mass from reverting to a muddy composition.

These results are based on the paint filter test. Landfill owners use the paint filter test to determine if a waste is a liquid and the amount of absorbent needed to solidify the material. Basically, the waste is placed on a 60-mesh paint filter. If water drips from the filter within five minutes, it is considered a liquid. The amount of solidifier needed is the amount of material that, when mixed with the liquid, does not drip within five minutes. The values shown in FIG. 1 are the minimum amounts of absorbent needed to pass the paint filter test. Note: The typical solidifers were chosen based on a survey of the local landfills.

The test results shown in FIG. 1 are based on deionized water and on waste motor oil. These results show that, in water, comparable amounts of red mud and typical solidifers are needed to absorb the same amount of water. The oil results show that the dried red mud absorbs the motor oil, requiring much less absorbent than comparable materials, and the product can be further handled by the landfill operator, whereas the typical solidifying agents do not leave a handlible material unless massive amounts are used.

Figure 2:
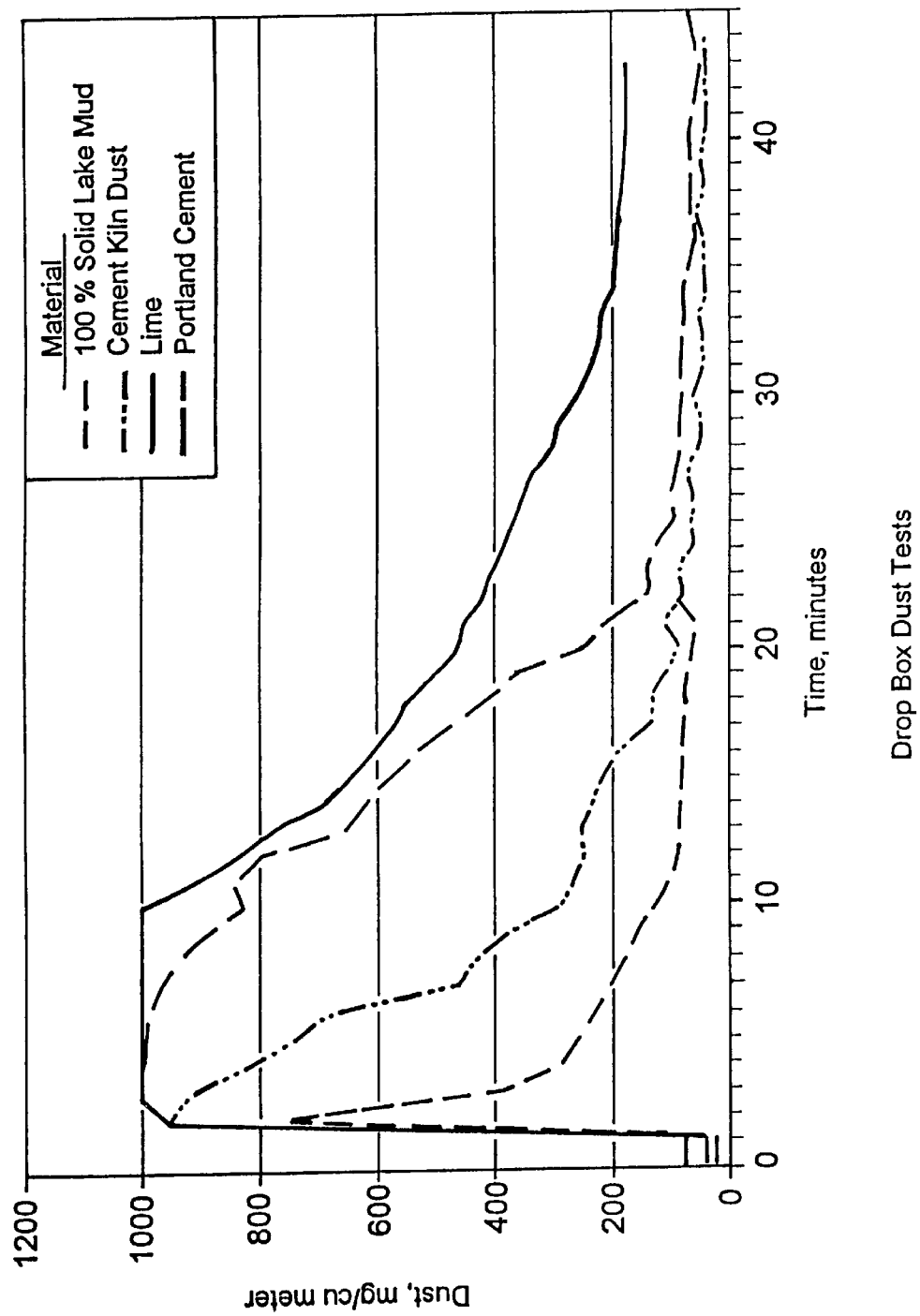
FIG. 2 is a chart setting forth material dustiness of the present invention, when compared with other prior art absorption compositions.

FIG. 2 presents the dust potential of the dried mud and the typical solidifiers. This data was developed using a drop box test. Basically, a sample of the material is placed on the trap door of a dust cabinet. The door is opened, allowing the sample to drop to the ground. A light sensitive meter measures the change in light intensity in the cabinet as the sample drops. These results show that the dried red mud is initially dusty, as is any dry material. However, it is not as dusty as the typical solidifier and settles more rapidly than the typical solidifier. This settling means that it will not be carried as far by the wind during application.

As seen in FIG. 3, extensive TCLP Tier II testing shows that the red mud does not leach metals into the environment. TCLP is a test designed to simulate the effects of 100 years of acid rain on the samples, and is the basis for determining metals mobility and environmental acceptability. The Tier II method is more stringent than the standard Tier I method due to the use of a more acidic leaching agent, and was chosen because of the potential buffer capacity in the red mud. The TCLP results show that no metals exceed the EPA limits.

Only cadmium had results close to 50% of the EPA limit. Those occurred only twice and the average of all cadmium in the leachate was 0.33 ppm.

Further, it is believed that the high iron content of the red mud of the present invention provides a means of engaging and isolating heavy metals, trapping them in the composition.

The ability of red mud to decrease odor is well noted in the literature. Early work indicates that red mud can be used to scrub sulfur dioxide from stack gases. Since sulfur dioxide is one of the major constituents of landfill odors, it stands to reason that the dried red mud should decrease the odor. The structures of the typical solidifying agents do not adsorb the sulfur dioxide, and therefore do not decrease the odor.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. The method of disposal of liquid landfill waste, comprising the steps of:
   a. recovering spent bauxite tailings from the Bayer alumina recovery process, such that said bauxite tailings form a composition comprising 45–55% $Fe_2O_3$, 10–20% $Al_2O_3$, and 5–10% $TiO_2$;
   b. dewatering and drying said composition so as to have a moisture content of less than 20% by weight, forming said bauxite tailings composition into particulate matter;
   c. providing a composition comprising particles having a generally uniform size of less than 1/8";
   d. applying said composition to water based wastes at a ratio of 1.6–2.6 gms/ml water.

2. The method of claim 1, in which there is provided, in step "b", the additional step of forming said particulate matter into particulates having a generally flat configuration, in such a manner as to provide a composition having a BET surface are of between 44–55 $M^2$/gm, a specific gravity of 2.9–3.3, and a bulk density of 70–85 pcf.

3. The method of claim 2, in which there is further provided, in step "c", the additional step of adding up to 10% by weight a pozzolanic solidifying agent such as Portland cement, fly ash, or lime.

4. The method of disposal of hydrocarbon liquid landfill leachate, comprising the steps of:
   a. recovering spent bauxite tailings from the Bayer alumina recovery process, such that said bauxite tailings form a composition comprising 45–55% $Fe_2O_3$, 10–20% $Al_2O_3$, and 5–10% $TiO_2$;
   b. dewatering and drying said composition so as to have a moisture content of less than 20% by weight, forming said bauxite tailings composition into particulate matter;
   c. providing a composition comprising particles having a generally uniform size of less than 1/8";
   d. applying said composition to a hydrocarbon based liquid wastes at a ratio of 1.3–2.3 gms/ml hydrocarbon.

5. The method of claim 4, in which there is provided, in step "b", the additional step of forming said particulate matter into particulates having a generally flat configuration, so as to provide a composition having a BET surface area of between 44–55 $M^2$/gm, a specific gravity of 2.9–3.3, and a bulk density of 70–85 pcf.

6. The method of claim 5, in which there is further provided, in step "c", the additional step of adding up to 10% by weight a pozzolanic solidifying agent.

* * * * *